(No Model.) 2 Sheets—Sheet 1.
C. E. SCRIBNER.
DYNAMOMETER.
No. 452,941. Patented May 26, 1891.
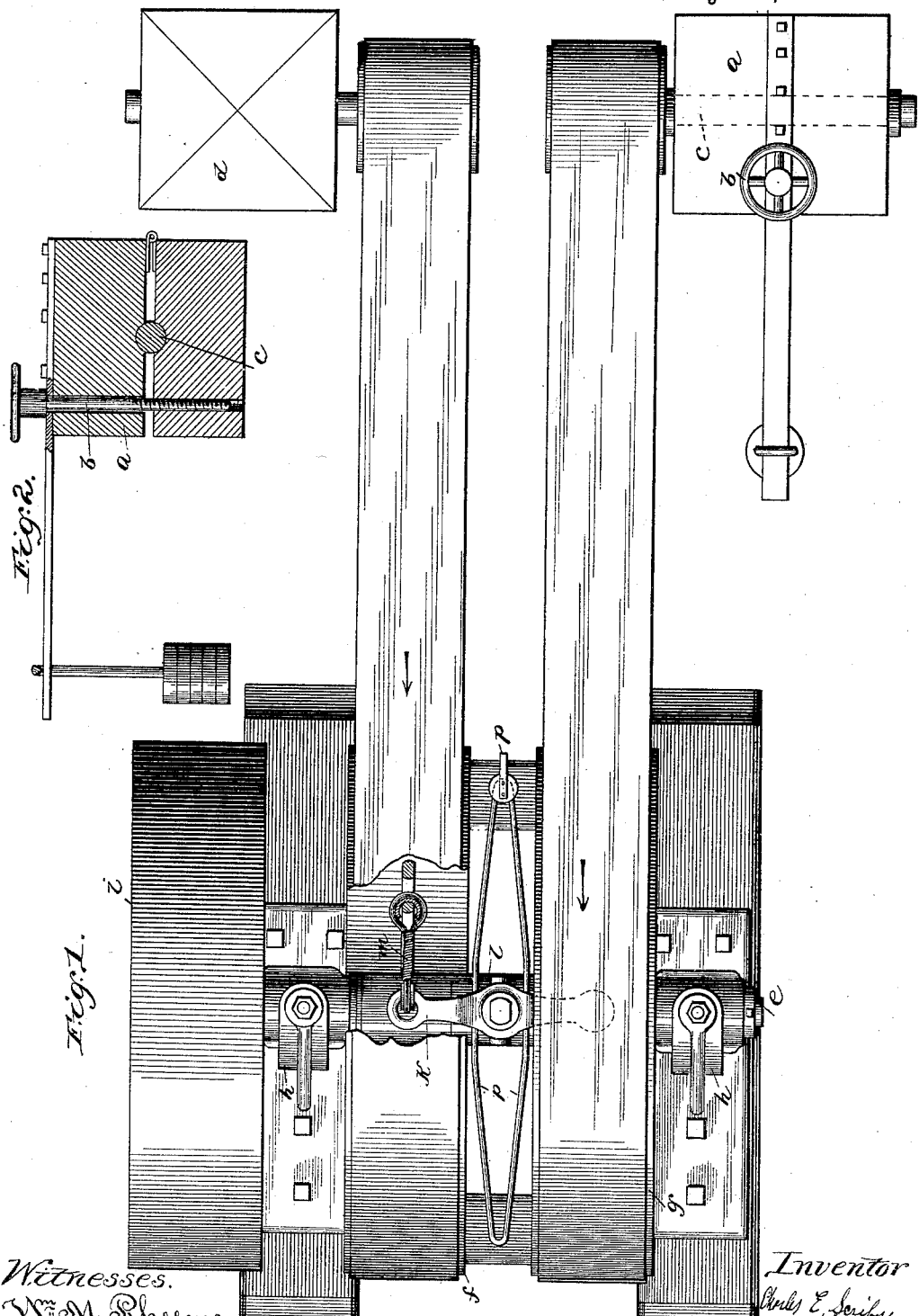

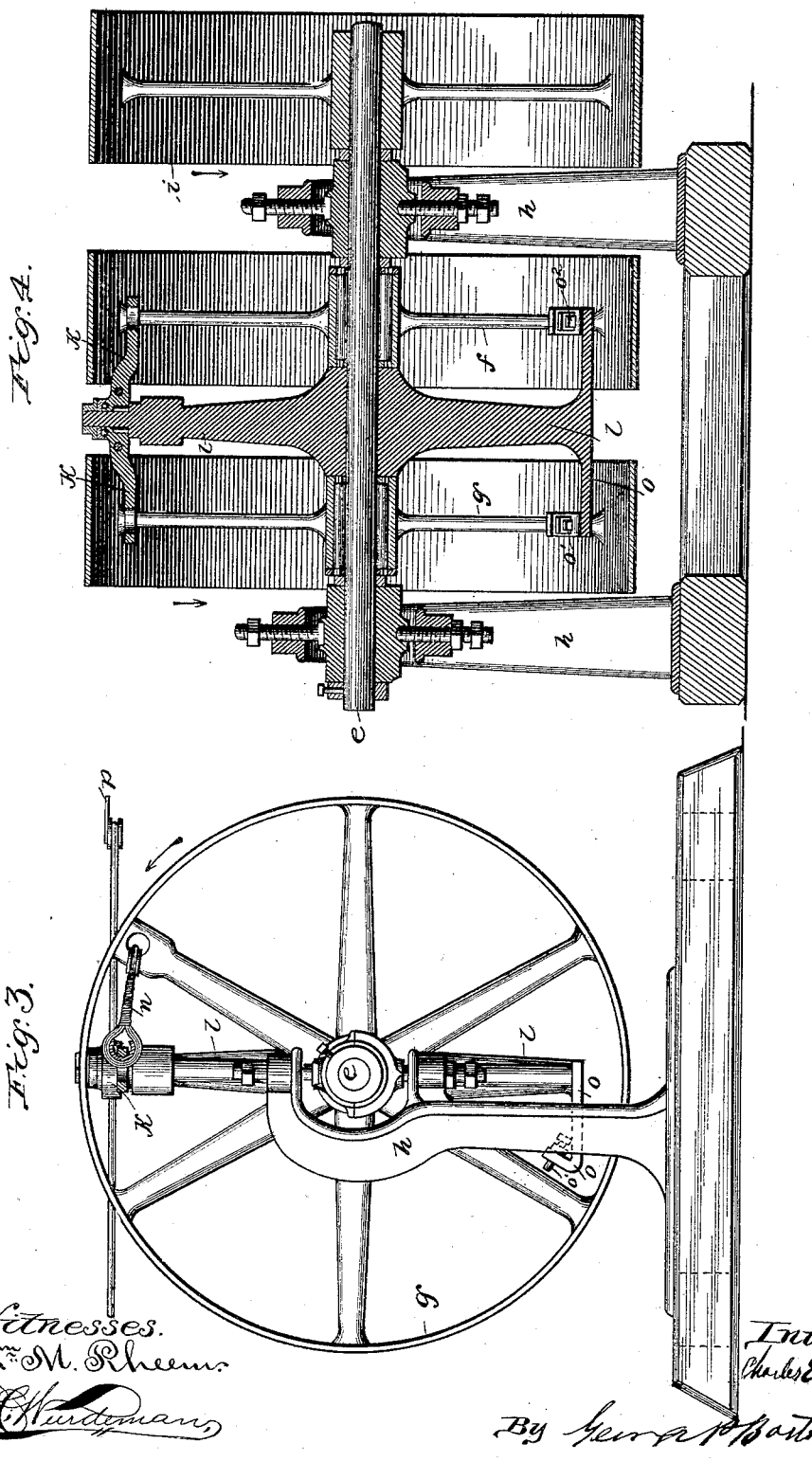

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

DYNAMOMETER.

SPECIFICATION forming part of Letters Patent No. 452,941, dated May 26, 1891.

Application filed October 13, 1890. Serial No. 367,903. (No model.)

*To all whom it may concern:*

Be it known that I, CHARLES E. SCRIBNER, a citizen of the United States, residing at Chicago, in the county of Cook and State of Illinois, have invented a certain new and useful Improvement in Dynamometers, (Case 231,) of which the following is a full, clear, concise, and exact description, reference being had to the accompanying drawings, forming a part of this specification.

My invention relates to dynamometers; and its object is to provide ready means of comparing the power taken by the working-shaft of a machine with a suitable adjustable standard of comparison. I use as such standard of comparison preferably a Prony brake.

My dynamometer herein described comprises a shaft and means for driving the same in connection with two pulleys loosely mounted upon said shaft, but linked to a cross-piece pivoted to an arm extending radially from the shaft, these pulleys being adapted to be connected by belts or otherwise, the one with the Prony brake, or whatever the standard of comparison may be, and the other with the working-shaft of the machine whose power it is desired to measure. The two loose pulleys are connected with the opposite ends of the pivoted cross-piece at equal distances from its fulcrum or pivot, so that each may, when loaded equally, hold the pivoted cross-pieces parallel with the shaft, or in what I will term its "zero position," its zero position being that position which it assumes when (the shaft being revolved) each of the loose pulleys is carrying the same load. The loose pulleys are independent in their movement upon the shaft only to a limited extent, say from half an inch, or a little more, and the amount of this independent movement may be adjusted as occasion may require. The arm fixed to the shaft and carrying the pivoted cross-piece is extended to the side of the shaft opposite the cross-piece, preferably in the form of a T, to form a stop for limiting the movement of the pulleys about the shaft. By means of adjusting-screws in this T-piece the amount of independent rotary movement as between the two loose pulleys may be adjusted.

In the drawings, which are illustrative of my invention, Figure 1 is a plan view of my dynamometer as used for measuring the power required to run a dynamo-electric machine. Fig. 2 is a sectional view of an ordinary form of Prony brake, such as I find convenient to use as a standard of comparison. Fig. 3 is an end elevation of my machine. Fig. 4 is a longitudinal central sectional view thereof.

Like parts are indicated by similar letters of reference throughout the different figures.

The Prony brake $a$ is of usual construction. By tightening the clamping screw $b$ to increase the friction upon the shaft $c$ the power required to drive said shaft may be increased—that is, the brake may be adjusted to absorb or require a greater or less amount of power—and thus the brake may be made to take the same power as is being taken by the dynamo-electric machine $d$, or whatever the machine may be whose power it is desired to measure.

The driven shaft $e$ carries the balanced pulleys $f$ $g$, by means of the rigidly-mounted arm $h$ and its connections with said pulleys. A driving-pulley $i$ or other suitable means may be provided for imparting the desired rotary movement to the shaft $e$. The cross-piece $k$ is pivoted to the arm $l$, which extends from the shaft $e$. The opposite ends of this cross-piece $k$ are connected each with its corresponding pulley. Thus a spoke of pulley $f$ is provided with a link $m$, connecting with one end of cross-piece $k$, while a spoke of pulley $g$ is provided with a link $n$, connecting with the other end of cross-piece $k$. It is through these links $m$ $n$ that power from the shaft is communicated to the pulleys $f$ $g$, these pulleys $f$ $g$ being in themselves provided with roller-bearings upon the shaft. The stop $o$ may be in the form of a T, extended so that the corresponding spokes of the pulleys $f$ $g$ will be brought against the same whenever either is revolved for a slight distance upon the shaft. By means of screws $o'$ $o^2$ at the different ends of the T-piece, as shown most clearly in Figs. 3 and 4, the amount of free movement or independent movement of the different pulleys upon the shaft may be adjusted.

The index or indicator $p$ is carried upon the pivoted cross-piece and therefore revolves with the shaft $e$. When the two pulleys are equally loaded, the pivoted cross-piece $k$ will stand parallel to the shaft, and hence the index $p$ in its revolutions will be at right angles to the shaft. This is termed the "zero position" of the apparatus, and indicates that the load upon each pulley is the same.

From the foregoing description the manner of using my dynamometer will be readily understood. Thus, suppose it is desired to measure the power required to run the dynamo-machine $d$. The belt from one pulley, as pulley $f$, is passed over the driven pulley upon the shaft of the Prony brake. The belt from the other pulley $g$ is passed over the driven pulley with the dynamo $d$, as shown.

It will be understood that the shaft $e$ is driven by a belt passing over the driven pulley $i$ to impart sufficient rotary movement to the shaft $e$. The Prony brake will now be adjusted either by loosening or tightening the screw as occasion may require until the index $p$ comes to the zero-point. This will indicate, as before described, that the power absorbed by the dynamo is equal to that of the power absorbed by the Prony brake. The power absorbed by the Prony brake, being a known quantity, of course determines the power required to run the machine.

I believe myself to be the first to compare directly the power absorbed by a machine with that of an adjustable standard, as that of a Prony brake.

My dynamometer may be advantageously used whenever it is desired to determine the power required to run a machine.

The two pulleys, each connected at different ends of the pivoted cross-piece, may be considered as a pair of balanced scales, the pulleys taking the place of the pans and the cross-piece being the scale-beam. The Prony brake is the standard weight and the power required to operate the dynamo or other machine the known quantity to be weighed or measured.

Having thus described my invention, I claim as new and desire to secure by Letters Patent—

1. The combination, with a driven shaft, of two pulleys mounted thereon, said pulleys being linked to different ends of a pivoted cross-piece carried upon an arm extending from the shaft, said pulleys having a slight rotary movement about the shaft, whereby the position of the pivoted arm is varied according to the relative loads carried by the pulleys.

2. In a transmission-dynamometer, the combination, with a constantly-rotated shaft, of two pulleys mounted thereon and adapted for free movement with relation to the shaft, and a scale-beam carried by the shaft and linked to the two pulleys to cause them to rotate with the shaft, while a limited movement upon the shaft is permitted to indicate a difference of pull upon the two pulleys.

3. In a transmission-dynamometer, a scale-beam mounted upon a shaft to revolve with the same, the scale-beam being pivoted to have independent motion, and two pulleys linked to the opposite ends of the scale-beam and adapted for movement therewith, whereby both the rotary motion of the shaft and an independent movement may be taken by the pulleys to compare the pressures placed upon the pulleys.

4. In a transmission-dynamometer, the shaft, the arm carried thereby, with the T-extension forming the pulley-stops, and the pivoted scale-beam upon the arm, two pulleys loosely mounted upon the shaft and linked to the opposite ends of the scale-beam, and the T-extension forming stops for the two pulleys, whereby a limited independent movement of the pulleys with relation to the shaft is secured.

5. In a transmission-dynamometer, the rotating shaft with the scale-beam carried thereby, scale engagements from the said scale-beam being provided to separate devices for the transmission of power, and an index attached to and moved by the said scale-beam to indicate its position during the rotation of the shaft, whereby the balance or lack of balance of the power transmission at the different ends of the scale-beam may be determined.

In witness whereof I hereunto subscribe my name this 26th day of September, A. D. 1890.

CHARLES E. SCRIBNER.

Witnesses:
ELLA EDLER,
G. L. CRAGG.